(12) United States Patent
Zhang et al.

(10) Patent No.: US 12,461,053 B2
(45) Date of Patent: Nov. 4, 2025

(54) BIOSENSOR FOR PERFORMING DETECTION ON BIOLOGICAL SAMPLE

(71) Applicant: LEADWAY (HK) LIMITED, Hong Kong (CN)

(72) Inventors: Tingting Zhang, Zhejiang (CN); Wei Jiang, Zhejiang (CN); Li Zhang, Zhejiang (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 528 days.

(21) Appl. No.: 17/757,559

(22) PCT Filed: Dec. 15, 2020

(86) PCT No.: PCT/CN2020/136415
§ 371 (c)(1),
(2) Date: Jun. 16, 2022

(87) PCT Pub. No.: WO2021/121207
PCT Pub. Date: Jun. 24, 2021

(65) Prior Publication Data
US 2023/0015561 A1    Jan. 19, 2023

(30) Foreign Application Priority Data

Dec. 20, 2019    (CN) .......................... 201911323085.6

(51) Int. Cl.
G01N 27/30    (2006.01)
G01N 27/327    (2006.01)

(52) U.S. Cl.
CPC .......... *G01N 27/30* (2013.01); *G01N 27/327* (2013.01)

(58) Field of Classification Search
CPC .................. G01N 27/30; G01N 27/327–3272
See application file for complete search history.

(56) References Cited

U.S. PATENT DOCUMENTS 3,854,324 A * 12/1974 Altshuler ........... G01N 33/4905
73/64.42
5,120,420 A *  6/1992 Nankai ................ C12Q 1/004
435/817

(Continued)

FOREIGN PATENT DOCUMENTS

CN     203965442 U     11/2014
CN     109946352 A     6/2019

(Continued)

OTHER PUBLICATIONS

U.S. Appl. No. 62/876,170, filed Jul. 19, 2019 (Year: 2019) (available on USPTO—Global Dossier).*

(Continued)

*Primary Examiner* — Alexander S Noguerola
(74) *Attorney, Agent, or Firm* — Michael A. Whittaker

(57) ABSTRACT

The present invention provides a biosensor for detecting a biological sample, comprising a first electrode and a second electrode, the first electrode comprising a first resistance element connected to a first conductive trace, the first resistance element being set in the following manner: when the sample is added, at a predetermined point in time for detecting an electrical parameter using the first electrode and second electrode, the sample covers at least a portion of the first resistance element, but does not flow beyond the front end of the first resistance element. After the sample is added, a coagulation indicator in the sample can be calculated by detecting the electrical parameter.

5 Claims, 4 Drawing Sheets

(56) References Cited

U.S. PATENT DOCUMENTS

| | | | | |
|---|---|---|---|---|
| 5,985,116 | A | * | 11/1999 | Ikeda .................. C12Q 1/001 204/290.11 |
| RE40,198 | E | * | 4/2008 | Buck, Jr. ............ G01N 27/3277 205/777.5 |
| 2009/0020439 | A1 | * | 1/2009 | Marquant ............. C12Q 1/001 205/792 |
| 2009/0236222 | A1 | * | 9/2009 | Murase .................. C12Q 1/61 204/403.14 |
| 2010/0193378 | A1 | * | 8/2010 | Bratov ............ G01N 33/54306 205/792 |
| 2013/0284610 | A1 | * | 10/2013 | Wilsey .............. G01N 27/3275 205/777.5 |
| 2016/0299138 | A1 | * | 10/2016 | Almasri ................ G01N 27/02 |
| 2017/0146530 | A1 | * | 5/2017 | Muraca ................ B01L 3/5027 |
| 2018/0251811 | A1 | * | 9/2018 | Hughes ............... G01N 33/721 |
| 2019/0216359 | A1 | * | 7/2019 | Chuang ............ G01N 33/48707 |
| 2021/0016275 | A1 | * | 1/2021 | Shi .................... G01N 33/4905 |

FOREIGN PATENT DOCUMENTS

| | | |
|---|---|---|
| CN | 110057890 A | 7/2019 |
| CN | 110243873 A | 9/2019 |
| CN | 110554075 A | 12/2019 |
| CN | 212134552 U | 12/2020 |
| CN | 212159648 U | 12/2020 |
| CN | 212255171 U | 12/2020 |
| WO | 00073778 A1 | 12/2000 |

OTHER PUBLICATIONS

Lawrie et al., "Prothrombin time derived fibrinogen determination on Sysmex CA-6000TM," J. Clin. Pathol. 1998;51:462-466 (Year: 1998).*

Helena Laboratories—"Thrombin Clotting Time Reagent", Cat. No. 5377, published Dec. 1991, author unknown (Year: 1991).*

National Cancer Institute definition of "fibrinogen" ,https://www.cancer.gov/publications/dictionaries/cancer-terms/def/fibrinogen, downloaded Dec. 4, 2024 (Year: 2024).*

Ghosh Dastider et al., Impedance biosensor based on interdigitated electrode array for detection of E. coli O157: H7 in food products. Proc. SPIE 8369, Sensing for Agriculture and Food Quality and Safety IV, 8369Q, May 2012; 8369: 1-7.

Ramaswamy et al., Microfluidic device and system for point-of-care blood coagulation measurement based on electrical impedance sensing. Sensors and Actuators B: Chemical. Apr. 2013; 180:21-27.

Extended European Search Report issued in EP 20901589 dated Dec. 5, 2023 (7 pages).

International Search Report issued in PCT/CN2020/136415 on Mar. 17, 2021, with English translation (8 pages).

* cited by examiner

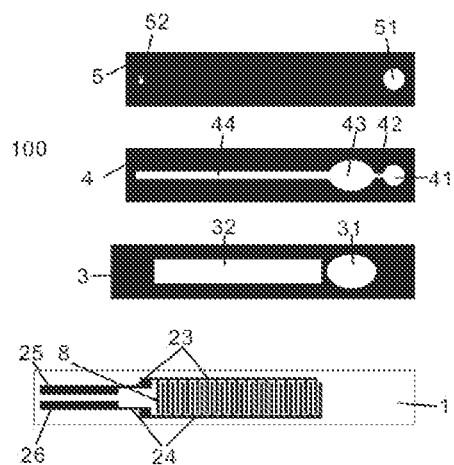
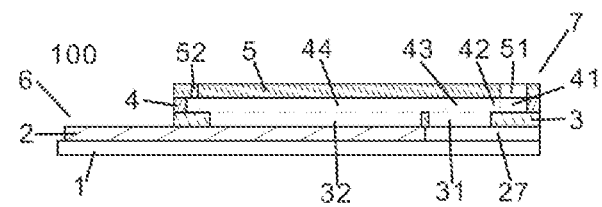
Figure 1
Figure 2
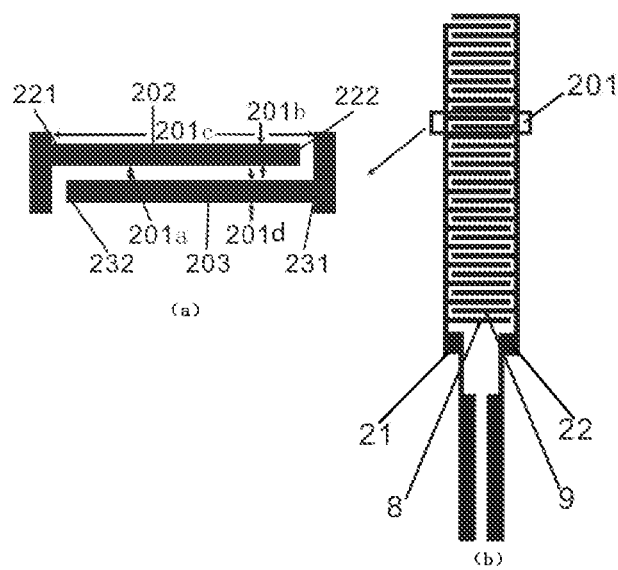
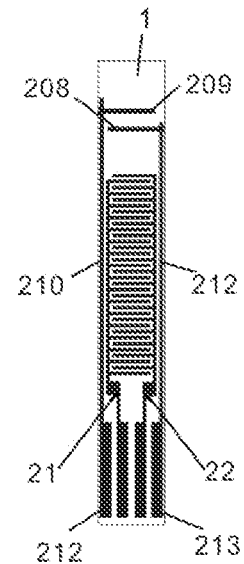
Figure 3
Figure 4
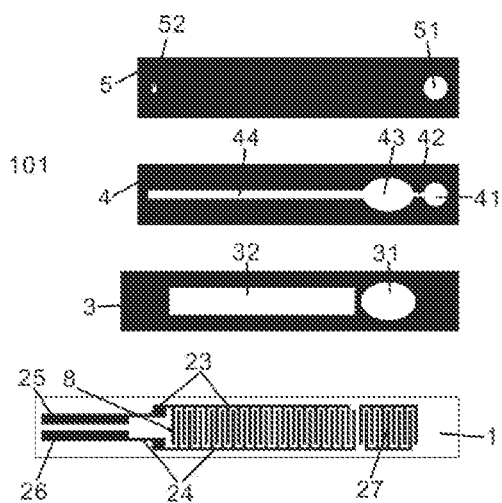
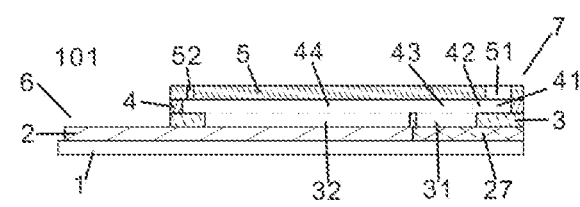
Figure 5
Figure 6

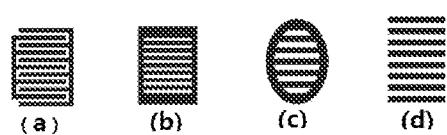
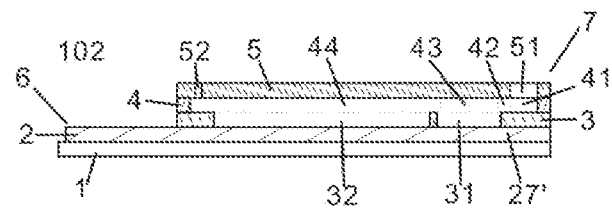
Figure 7
Figure 9
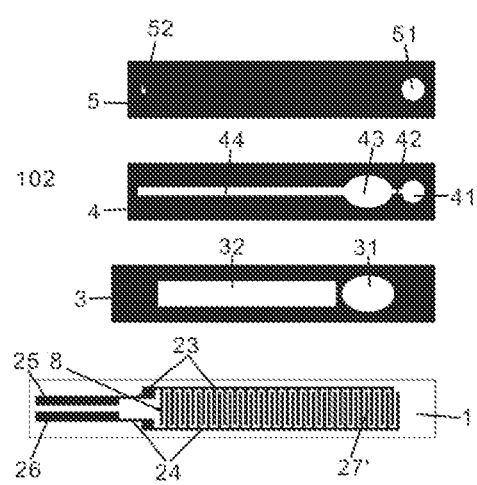
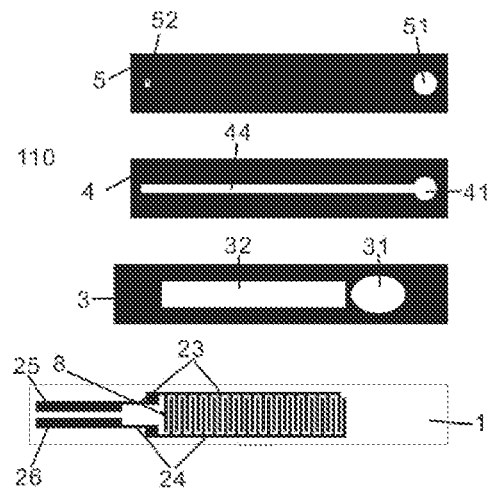
Figure 8
Figure 10
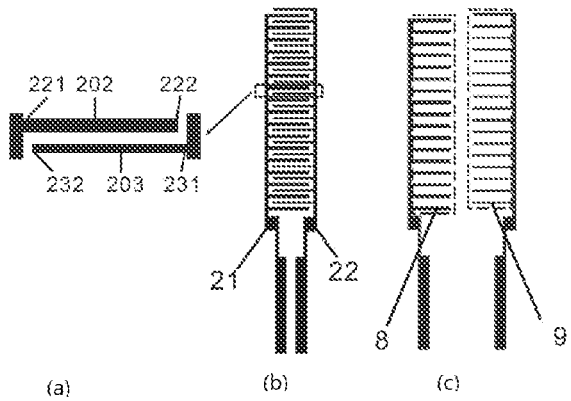
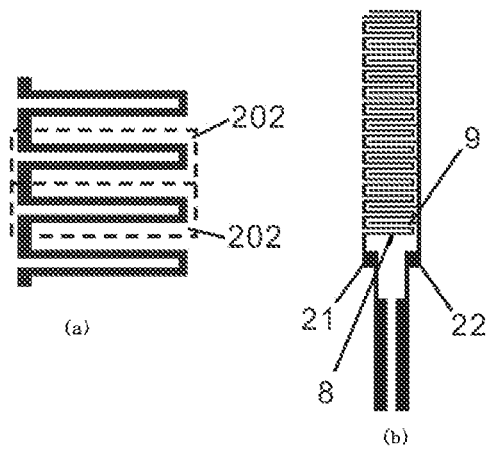
Figure 11
Figure 12

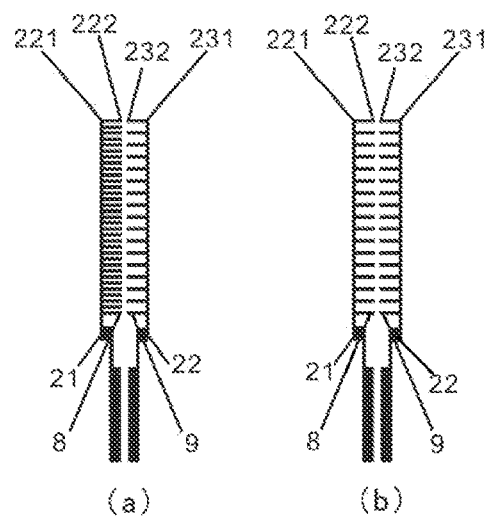
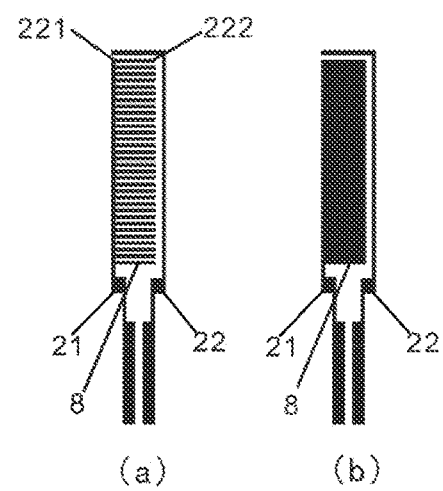
Figure 13
Figure 14
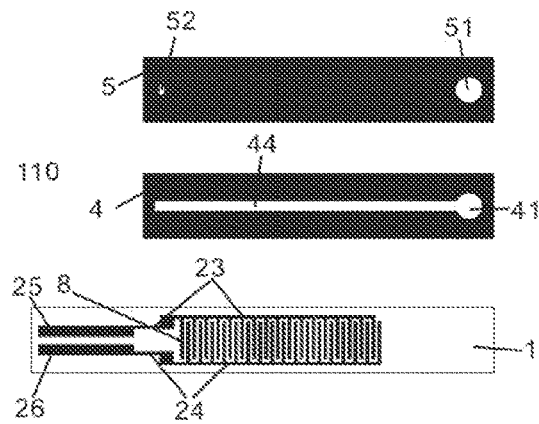
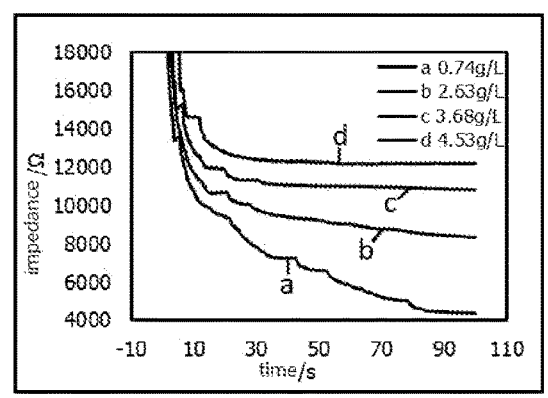
Figure 15
Figure 16
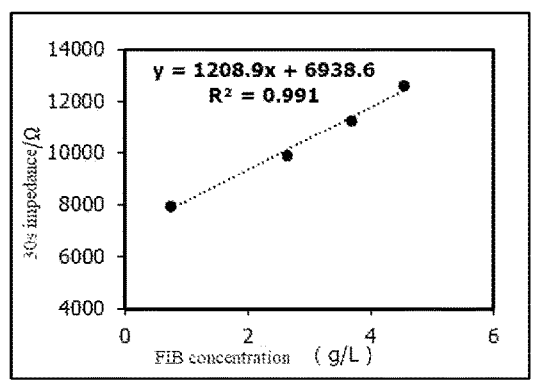
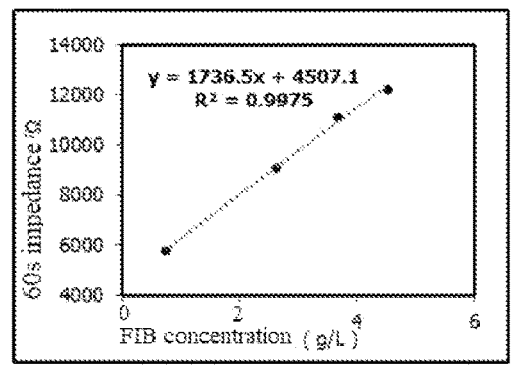
Figure 17 (a)
Figure 17 (b)

BIOSENSOR FOR PERFORMING DETECTION ON BIOLOGICAL SAMPLE

CROSS-REFERENCE TO RELATED MATTERS

The present invention is filed under 35 U.S.C. § 371 as the U.S. national phase of International Patent Application No. PCT/CN2020/136415, filed Dec. 15, 2020, which designated the United States and claims priority to Chinese Patent Application No. 201911323085.6, filed Dec. 20, 2019, each of which is hereby incorporated in its entirety including all tables, figures and claims.

FIELD OF THE INVENTION

The present invention relates to a biosensor for detecting a biological sample, and belongs to the technical field of electroanalytical chemical detection.

BACKGROUND OF THE INVENTION

Fibrinogen (FIB), i.e., coagulation factor I, is synthesized by the liver, and has a content of 2.0-4.0 g/L in plasma. FIB is an important reactive substrate for thrombosis and involves in key steps of thrombosis.

At present, the FIB detection methods commonly used in the market are generally optical detection, and the common ones are the coagulation method and the PT-der method. Coagulometers taking the coagulation method as the principle are relatively widely used, and most of the methods used are the von-Clauss method, which has the principle that thrombin converts soluble plasma FIB into insoluble fibrin multimers. Under the condition of high concentration of thrombin (3000 to 30000 IU/mL) and low concentration of FIB (generally diluted to 0.05 to 0.8 g/L), the plasma coagulation time is determined by the FIB concentration, and is inversely proportional to the FIB concentration. The PT-der method refers to that in the reaction process of prothrombin time (PT), the content of FIB and blood clotting time are negatively correlated, therefore, if the difference value of absorbance change is larger within a same period of time, it suggests a higher FIB content. Based on this basic principle, the content of FIB can be deduced by certain mathematical calculations after the detection of PT. The PT-der method is not accurate enough for detection of samples with high concentration of FIB.

The samples used in the above coagulation method and PT-der method are generally plasma, which requires centrifugation of the extracted blood before optical detection, and thus has the disadvantages of usage of a larger amount of the blood samples and a complicated and time-consuming detection process, etc.

SUMMARY OF THE INVENTION

The present invention provides a biosensor and detection method for detection of a coagulation indicator such as FIB by an electrical parameter, which can directly use a blood sample for detection, with fewer pre-processing steps and simplified detection procedures. At the same time, the detection method and the display of detection results are more intuitive.

The present invention provides a biosensor for detecting a biological sample, which has a sample addition end and comprises an insulating substrate, a channel forming layer, and a reaction reagent, wherein an electrode system is disposed on the insulating substrate, and comprises at least a first electrode and a second electrode, the first electrode comprising a first contact and a first conductive trace connected to the first contact; the first electrode comprises a first resistance element connected to the first conductive trace, the first resistance element comprising at least one resistance unit and extending toward the second electrode but not connected to the second electrode; the channel forming layer is provided with a sample receiving area and a detection channel in communication in liquid path, the detection channel being in communication with the electrode system in liquid path; the second electrode comprises a second contact and a second conductive trace connected to the second contact; the second electrode comprises a second resistance element connected to the second conductive trace, the second resistance element comprising at least one resistance unit; at least a part of the second resistance element is exposed by the detection channel;

the first resistance element is set in the following manner: after a sample is added, at a predetermined point in time for detecting an electrical parameter using the first electrode and the second electrode, the sample covers at least a part of the first resistance element but does not flow beyond the front end of the first resistance element.

Preferably, the reaction reagent is located between the first resistance element and the sample addition end.

Preferably, the first resistance element comprises a plurality of resistance units, the plurality of resistance units of the first resistance element being set in a manner selected from one of the two ways below: (1) the plurality of resistance units of the first resistance element are spaced apart from each other, a first end of each resistance unit of the first resistance element is connected to the first conductive trace, and a second end of each resistance unit of the first resistance element extends toward the second electrode but is not connected to the second electrode; (2) a resistance unit of the first resistance element is connected to the first conductive trace, any two adjacent resistance units of the first resistance element are connected end to end, and a part located between the two ends of each resistance unit of the first resistance element extends toward the second electrode but is not connected to the second electrode.

Preferably, when the plurality of resistance units of the first resistance element are spaced apart from each other, any two adjacent resistance units of the first resistance element have the same distance spacing.

Preferably, the second electrode comprises a second contact and a second conductive trace connected to the second contact; the second electrode comprises a second resistance element connected to the second conductive trace, the second resistance element comprising at least one resistance unit and extending toward the first electrode but not connected to the first electrode, the distance between the front end of the second resistance element and the sample addition end being smaller than or equal to the distance between the front end of the first resistance element and the sample addition end.

Preferably, the second resistance element comprises a plurality of resistance units, the plurality of resistance units of the second resistance element being set in a manner selected from one of the two ways below: (1) the plurality of resistance units of the second resistance element are spaced apart from each other, a first end of each resistance unit of the second resistance element is connected to the second conductive trace, and a second end of each resistance unit of the second resistance element extends toward the first electrode but is not connected to the first electrode; (2) a resistance unit of the second resistance element is connected to the second conductive trace, any two adjacent resistance units of the second resistance element are connected end to end, and a part between the two ends of each resistance unit of the second resistance element extends toward the first electrode but is not connected to the first electrode.

Preferably, when a plurality of resistance units of the second resistance element are spaced apart from each other, any two adjacent resistance units of the second resistance element have the same distance spacing.

Preferably, when the plurality of resistance units of the first resistance element are spaced apart from each other and the plurality of resistance units of the second resistance element are spaced apart from each other, the distance spacing between any two adjacent resistance units of the second resistance element is equal to that between any two adjacent resistance units of the first resistance element.

Preferably, when the plurality of resistance units of the second resistance element are spaced apart from each other and the plurality of resistance units of the first resistance element are spaced apart from each other, the first resistance element and the second resistance element are set in a manner selected from one of the two ways below: (1) the second end of each resistance unit of the first resistance element extends toward the second electrode and does not extend beyond the second end of each resistance unit of the second resistance element; the second end of each resistance unit of the second resistance element extends toward the first electrode but does not extend beyond the second end of each resistance unit of the first resistance element; (2) the second end of each resistance unit of the first resistance element extends toward the second electrode and extends beyond the second end of each resistance unit of the second resistance element; the second end of each resistance unit of the second resistance element extends toward the first electrode and extends beyond the second end of each resistance unit of the first resistance element.

Preferably, the plurality of resistance units of the first resistance element and the plurality of resistance units of the second resistance element form an interdigital structure, which contains a plurality of interdigital electrode pairs each comprising a resistance unit of the first resistance element and a resistance unit of the second resistance element.

Preferably, the detection channel exposes the middle portion but not two ends of each interdigital electrode pair in the interdigital width direction.

The present invention further provides a system for detecting a coagulation indicator, comprising the biosensor of the present invention and a detection instrument, the biosensor being inserted into an electrical connector of the detection instrument through the first contact and the second contact; after a sample is added to the biosensor, at a predetermined point in time for detecting an electrical parameter using the first electrode and the second electrode, the electrical parameter is measured using the detection instrument, and the coagulation indicator in the sample is calculated based on the electrical parameter.

In addition, the present invention further provides a method for detecting a coagulation indicator in a sample, comprising the following steps: (1) providing the biosensor of the present invention; (2) inserting the biosensor into an electrical connector of an detection instrument through a first contact and a second contact; (3) after a sample is added to the biosensor, at a predetermined point in time for detecting an electrical parameter using the first electrode and the second electrode, using the detection instrument to measure the electrical parameter; and (4) calculating the coagulation indicator in the sample based on the electrical parameter.

The present invention further provides a method for manufacturing a biosensor, comprising the steps: (1) providing an electrode system on an insulating substrate, the electrode system comprising at least a first electrode and a second electrode, the first electrode comprising a first contact and a first conductive trace connected to the first contact, the second electrode comprising a second contact and a second conductive trace connected to the second contact; the first electrode comprising a plurality of resistance units, at least one resistance unit of the first electrode being connected to the first conductive trace; the second electrode comprising a plurality of resistance units, at least one resistance unit of the second electrode being connected to the second conductive trace, the plurality of resistance units of the first electrode and the plurality of resistance units of the second electrode forming an interdigital structure, which contains a plurality of interdigital electrode pairs each comprising one resistance unit of the first electrode and one resistance unit of the second electrode; the first resistance element being set in the following manner: after a sample is added, at a predetermined time point for detecting a coagulation indicator by using the first electrode and the second electrode, the sample covers at least a part of the first resistance element but does not flow beyond the front end of the first resistance element; (2) providing a channel forming layer on the insulating substrate, forming, on the channel forming layer, a sample receiving area and a detection channel in communication in liquid path, the detection channel being in communication with the electrode system in liquid path; and (3) providing an upper cover layer on the channel forming layer.

The present invention further provides a biosensor having a sample addition end, the biosensor comprising an insulating substrate, a channel forming layer and an upper cover layer, wherein an electrode system is disposed on the insulating substrate; the channel forming layer is located between the insulating substrate and the upper cover layer and is provided with a sample receiving area and a detection channel that are in communication in liquid path; the channel forming layer further comprises a channel extension area and a flow limit channel; the sample receiving area, the flow limit channel, the channel extension area and the detection channel are sequentially arranged and in communication in liquid path, the width of the flow limit channel being smaller than that of each of the sample receiving area and the channel extension area.

The present invention has the following beneficial effects: (1) the biosensor of the present invention can be manufactured by a method such as screen printing, which is simple to make and inexpensive in cost and facilitates manufacture on a large scale; (2) compared with most of the optical methods on the market for detecting a coagulation indicator such as FIB, it greatly increases the intuitiveness of the detection results, is simple in detection process, and obtains the results faster; (3) by providing the flow limit channel to limit the flow rate of the sample and providing the channel extension area to ensure adequate diffusion of the sample, it ensures adequate mixing and reaction of the sample and the reaction reagent, thus reducing the detection difference and improving the detection accuracy of the biosensor; (4) it is applicable to wider types of samples, not limited to plasma, and also can be applied to whole blood (such as fingertip blood and venous blood), so there is no need for tedious pretreatment of blood; (5) the use amount of the sample is little, and the detection can be achieved with one drop of blood (10 to 20 μl); and (6) the biosensor of the present invention is portable and can be used for POCT (point-of-care testing) without professional guidance.

BRIEF DESCRIPTION OF THE DRAWINGS

FIG. 1 is an exploded view of a first embodiment of the present invention.

FIG. 2 is a side schematic diagram of the first embodiment of the present invention.

FIG. 3(a) is an interdigital structure formed by the first electrode and the second electrode of the present invention, and FIG. 3(b) is a partially enlarged view of one interdigital electrode pair in FIG. 3(a).

FIG. 4 is a front schematic diagram of a second embodiment of the present invention.

FIG. 5 is an exploded view of a third embodiment of the present invention.

FIG. 6 is a side schematic diagram of the third embodiment of the present invention.

FIG. 7 shows structure diagrams of multiple structures of auxiliary diffusion assemblies in the third embodiment of the present invention.

FIG. 8 is an exploded view of a fourth embodiment of the present invention.

FIG. 9 is a side schematic diagram of the fourth embodiment of the present invention.

FIG. 10 is an exploded view of a fifth embodiment of the present invention.

FIG. 11(b) is a structure diagram of a first variant of the first electrode and the second electrode in a sixth embodiment of the present invention, FIG. 11(a) is a partially enlarged view of one interdigital electrode pair in FIG. 11(b), and FIG. 11(c) is a schematic diagram of the interdigital structure in FIG. 11(b) after disassembling.

FIG. 12(b) is a structure diagram of a second variant of the first electrode and the second electrode in the sixth embodiment of the present invention, and FIG. 12(a) is a structure diagram of each serpentine unit of the first resistance element in FIG. 12(b).

FIG. 13(a) is a structure diagram of a third variant of the first electrode and the second electrode in the sixth embodiment of the present invention, and FIG. 13(b) is a structure diagram of a fourth variant of the first electrode and the second electrode in the sixth embodiment of the present invention.

FIG. 14(a) is a structure diagram of a fifth variant of the first electrode and the second electrode in the sixth embodiment of the present invention, and FIG. 14(b) is a structure diagram of a sixth variant of the first electrode and the second electrode in the sixth embodiment of the present invention.

FIG. 15 is an exploded view of a fifth embodiment of the present invention in the case of no insulating layer.

FIG. 16 is graph of detection results obtained by utilizing the impedance method for detection, when using the reaction reagent 1 of the present invention in Example 1 and using the sensor structure in the third embodiment of the present invention.

DETAILED DESCRIPTION OF THE EMBODIMENTS

Figure 17:
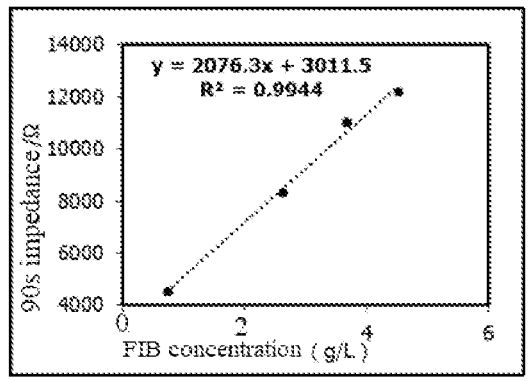
FIG. 17(a) is a linear equation graph obtained by using the impedance method for detection at 30s.
FIG. 17(b) is a linear equation graph obtained by using the impedance method for detection at 60s.
FIG. 17(c) is a linear equation graph obtained by using the impedance method for detection at 90s, when using the reaction reagent 1 of the present invention in Example 1 and using the biosensor structure in the third embodiment of the present invention.

In a first embodiment of the present invention, as shown in FIGS. 1 and 2, a biosensor (also referred to as a test strip) 100 is a lamellar structure having an electrical connection end 6 and a sample addition end 7, which includes an insulating substrate 1, an insulating layer 3, a channel forming layer 4, and an upper cover layer 5. The insulating substrate 1, the insulating layer 3, the channel forming layer 4, and the upper cover layer 5 are all made of insulating materials. Preferred insulating materials are polyvinyl chloride (PVC), polycarbonate, polysulfone resin, nylon plastic, polyurethane, cellulose nitrate, cellulose propionate, cellulose acetate, cellulose butyrate acetate, polyester fiber, polyimide, polypropylene, polyethylene and polystyrene. Various constituent parts of the test strip 100 may be laminated together, or bonded together with a binder, or the insulation layer 3, the channel forming layer 4 and the upper cover layer 5 may be printed sequentially on the insulating substrate 1 by screen printing. Preferably, the surface of the upper cover layer 5 in contact with the channel forming layer 4 is coated with a layer of hydrophilic material, and common hydrophilic materials include starch, polysaccharides cellulose molecule, polyacrylic acid, polypropylene phthalamide, polyvinyl alcohol, polyurethane and polyamide, etc.

An electrode system 2 is disposed on the insulating substrate 1. The electrode system 2 includes at least one pair of electrodes: a first electrode 21 and a second electrode 22, as shown in FIGS. 1 and 3. The first electrode 21 includes a first contact 25 at the electrical connection end 6 and a first conductive trace 23 connected to the first contact 25. The second electrode 22 includes a second contact 26 at the electrical connection end 6 and a second conductive trace 24 connected to the second contact 26. The first conductive trace 23 and the second conductive trace 24 may be formed by performing scribing or scoring on the insulating substrate 1, or be formed on the insulating substrate 1 by screen printing or plating. Preferably, such scribing or scoring may be performed by laser cutting. Of course, more conductive traces can be disposed on the insulating substrate 1 as desired. The first electrode 21 and the second electrode 22 may be made of any conductive material, such as carbon film, gold, silver, tin oxide/gold, platinum, other precious metals or their oxides.

The first electrode 21 includes a first resistance element, which includes a plurality of resistance units 202 spaced apart from each other; and the second electrode 22 includes a second resistance element, which includes a plurality of resistance units 203 spaced apart from each other. The first resistance element is provided in the following manner: after a sample is added, at a predetermined detection point in time for determining a coagulation indicator between the first electrode 21 and the second electrode 22, the sample covers at least a part of the first resistance element but does not flow beyond the front end 8 of the first resistance element. The distance between the front end 9 of the second resistance element and the sample addition end 7 is smaller than the distance between the front end 8 of the first resistance element and the sample addition end 7.

Each resistance unit 202 may have the same dimension (e.g., same length, width, and thickness) and material, but it is also of course possible that some resistance units 202 have different dimensions and materials. Any two adjacent resistance units 202 remain parallel and the distance between the two remains the same. The first end 221 of each resistance unit 202 is connected to the first conductive trace 23; and the second end 222 of each resistance unit 202 extends toward the second electrode 22, extends beyond the second end 232 of each resistance unit 203, but is not connected to the second electrode 22. For the second electrode 22, each resistance unit 203 may have the same dimension (e.g., the same length, width, and thickness) and material, but it is also of course possible that some resistance units 203 have different dimensions and materials. Any two adjacent resistance units 203 remain parallel, and the distance between the two remains the same. The first end 231 of each resistance unit 203 is connected to the second conductive trace 24, and the second end 232 of each resistance unit 203 extends toward the first electrode 21, extends beyond the second end 222 of each resistance unit 202, but is not connected to the first electrode 21. Each resistance unit 202 and each resistance unit 203 may be selected from a resistance strip or a resistance sheet.

The first electrode 21 and the second electrode 22 form an interdigital structure 200, specifically, a plurality of resistance units 202 of the first resistance element and a plurality of resistance units 203 of the second resistance element form the interdigital structure 200. The interdigital structure 200 contains a plurality of interdigital electrode pairs 201. It will be better if more interdigital electrode pairs 201 of the interdigital structure 200 are provided, but limited to the size of the test strip 100 and the accuracy of the manufacturing process such as screen printing, it is preferably 10 to 50 pairs, more preferably 20 to 30 pairs. Each interdigital electrode pair 201 includes a resistance unit 202 from the first resistance element and a resistance unit 203 from the second resistance element. In the interdigital structure 200, the resistance units 202 and the resistance units 203 are alternately arranged, with any adjacent resistance unit 202 and resistance unit 203 remaining parallel. The distances between only some adjacent resistance units 202 and resistance units 203 may remain the same, or the distance between any adjacent resistance unit 202 and resistance unit 203 may remain different. Preferably, the distance between any adjacent resistance units 202 and resistance units 203 remains the same.

The interdigital width 201c of each interdigital electrode pair 201 is a vertical distance between the first end 221 of the resistance unit 202 and the first end 231 of the resistance unit 203 in the direction of the width of the interdigital electrode pair 201, which is related to the width of the test strip 100 and may be ½ to ⅘ the width of the test strip 100, preferably 3 to 6 mm, preferably 5 mm. In each interdigital electrode pair 201, the thickness of the resistance unit 202 is defined as the interdigital thickness 201b, and the thickness of the resistance unit 203 is defined as the interdigital thickness 201d. Preferably, the interdigital thickness 201b and the interdigital thickness 201d have the same thickness. The interdigital gap 201a of each interdigital electrode pair 201 is defined as the distance between the adjacent resistance unit 202 and resistance unit 203.

If the interdigital thickness 201b, the interdigital thickness 201d, and the interdigital gap 201a of each interdigital electrode pair 201 are smaller within a certain range, the sensitivity and response speed of the test strip 100 will be higher. However, too small width and gap are disadvantageous for screen printing, in order to not only ensure sensitivity and response speed but also facilitate screen printing, the interdigital thickness 201b and the interdigital thickness 201d are set to be 0.1 to 0.4 mm, preferably 0.2 to 0.3 mm, and the interdigital gap 201a is 0.1 to 0.5 mm, preferably 0.2 to 0.3 mm.

The insulating layer 3 is located between the insulating substrate 1 and the channel forming layer 4. The insulation layer 3 may also extend toward the sample addition end 7 or extend toward the electrical connection end 6, and may partially, but not wholly cover the first contact 25 and the second contact 26, so as to ensure that the first contact 25 and the second contact 26 can be connected to a measuring instrument for measuring an electrical parameter between the first electrode 21 and the second electrode 22. It can ensure that the first electrode 21 and the second electrode 22 form an open circuit together with an electric circuit inside the measuring instrument, after the sample is added, the sample makes such open circuit on to form a closed loop, so that an electrical parameter can be measured using the first electrode 21 and the second electrode 22. Such electrical parameter may be impedance, voltage, current or conductance, etc., preferably impedance.

According to a predetermined screen, a hydrophobic insulating material (such as insulating ink) can be printed on the insulating substrate 1 through a screen printing method to get the insulating layer 3. In screen printing, a part of the surface of the insulating substrate 1 is not printed with the insulating material, thereby creating a reagent reaction area 31 and a detection area 32 on the insulating layer 3. The reagent reaction area 31 is close to the sample addition end 7 and the detection area 32 is close to the electrical connection end 6. The shape of the reagent reaction area 31 may be selected from rectangular, elliptical, circular, tangential rectangular, and other geometric shapes. In the insulating layer 3, the areas other than the reagent reaction area 31 and the detection area 32 are both hydrophobic insulating materials (preferably insulating ink), so that when a reaction reagent solution is added to the reagent reaction area 31, the reaction reagent solution diffuses only within the reagent reaction area 31 but does not diffuse to the outside of the reagent reaction area 31; after the sample is added, the mixture formed after the sample dissolves the reaction reagent will not diffuse to the outside of the detection area 32. Preferably, the reagent reaction area 31 and the detection area 32 are provided as two separated areas, and the reagent reaction area 31 and the detection area 32 are spaced by 0.1 to 5 mm, so that it can ensure that the reaction reagent solution added to the reagent reaction area 31 does not flow from the reagent reaction area 31 to the detection area 32, which ensures the uniformity of dispersion of the reaction reagent solution in the reagent reaction area 31 as much as possible, and also ensures the uniformity of dispersion of the reaction reagent solution between different batches of test strips 100.

The detection area 32 is disposed above the interdigital structure 200 formed by the first electrode 21 and the second electrode 22, exposing all the interdigital electrode pairs 201 of the interdigital structure 200. Preferably, the detection area 32 exposes the middle portion but not two ends of each interdigital electrode pair 201 in the interdigital width direction, so that it can ensure that when the sample is added, the sample flows uniformly in the middle portion of each interdigital electrode pair 201 as much as possible, thereby reducing the measurement error caused by the sample flowing at the two end portions of each interdigital electrode pair 201.

Of course, the insulating layer 3 can also be only provided with the reagent reaction area 31 without the detection area 32, preferably provided with the detection area 32, thus facilitating the insulating layer 3 in tighter contact with the insulating substrate 1 and the channel forming layer 4 when the biosensor assembly is performed.

The insulating layer 3 may undergo laser cutting so that the insulating layer 3 contains the reagent reaction area 31 and the detection area 32. Laser cutting may be performed before and after the insulating layer 3 and the insulating substrate 1 are assembled together. The insulating layer 3 may optionally be a double-sided tape or single-sided tape, so that the insulating layer 3 can be directly adhered to the insulating substrate 1. Moreover, the insulating layer 3 may also be supported by a plastic sheet, and then one side of the plastic sheet is coated with a pressure-sensitive binder or a photosensitive polymer: the photosensitive polymer is bonded to the insulating substrate 1 under the action of ultrasound, or the pressure-sensitive binder is bonded to the insulating layer 3 through extrusion.

The channel forming layer 4 is disposed on the insulating layer 3. The channel forming layer 4 has a sample receiving area 41 located at the sample addition end 7 and an elongated detection channel 44. The channel forming layer 4 also has a flow limit channel 42 and a channel extension area 43, which are located between the detection channel 44 and the sample receiving area 41. The flow limit channel 42 is located between the sample receiving area 41 and the channel extension area 44, and the channel extension area 43 is located between the flow limit channel 42 and the detection channel 44. The sample receiving area 41, the flow limit channel 42, the channel extension area 43 and the detection channel 44 are in communication in liquid path. The sample receiving area 41, the flow limit channel 42 and the channel extension area 43 are in a dumbbell structure.

The flow limit channel 42 is next to the sample receiving area 41, and connected to the sample receiving area 41. The width of the flow limit channel 42 is smaller than the width of the sample receiving area 41, and is $1/30$ to $1/5$, preferably $1/8$ to $1/20$, that of the sample receiving area 41; and the width of the flow limit channel 42 is also smaller than the width of the channel extension area 43, and is $1/40$ to $1/5$, preferably $1/30$ to $1/10$, that of the channel extension area 43. In this way, the flow rate of the sample can be limited, so that the sample can be mixed and reacted with the reaction reagent in the reagent reaction area 31 as fully as possible. The channel extension area 43 is next to and connected to the flow limit channel 42, the channel extension area 43 is similar to the reagent reaction area 31 in shape, and the channel extension area 43 is disposed above the reagent reaction area 31, leaving the reagent reaction area 31 to be wholly or at least partially exposed. Preferably, the flow limit channel 42 does not overlap with the reagent reaction area 31.

Spacing the sample receiving area 41 apart from the channel extension area 43 by the flow limit channel 42 has the advantage of ensuring that the sample is uniformly and slowly mixed and reacted with the reaction reagent in the reagent reaction area 31, thereby helping to reduce measurement difference.

The detection channel 44 is connected to the channel extension area 43, with the detection channel 44 located above the detection area 32, leaving the detection area 32 to be partially or wholly exposed. The width of the detection channel 44 may be larger than or equal to or smaller than the width of the detection area 32, with the width of the detection channel 44 being $1/10$ to 10 times the width of the detection area 32. When the width of the detection channel 44 is larger or smaller than the width of the detection area 32, this can ensure that the width of the interdigital structure exposed by the detection channel 44 does not change due to the relative offset among the insulating substrate 1, the insulation layer 3 and the channel forming layer 4 during assembly of the test strip 100, thus ensuring that the electrical signals generated by different batches of test strips 100 remain consistent. Preferably, the width of the detection channel 44 is larger than the width of the detection area 32, i.e., 1.2 to 3 times the width of the detection area 32; more preferably, the width of the detection channel 44 is smaller than the width of the detection area 32, i.e., $1/5$ to $4/5$ the width of the detection area 32, which can reduce the required amount of the sample.

Preferably, the end of the detection channel 44 close to the electrical connection end 6 can be aligned with the end of the detection area 32 close to the electrical connection end 6. More preferably, the detection channel 44 may also continue to extend toward the electrical connection end 6 to the insulating area of the insulating layer 3 close to the electrical connection end 6, but cannot be aligned with the electrical connection end 6 of the insulating layer 3, so as to avoid a short circuit formed by connection of different conductive traces (e.g., the first conductive trace 23 and the second conductive trace 24) due to outward leakage of the sample from the detection channel 44.

The areas in the channel forming layer 4 that surround the sample receiving area 41, the flow limit channel 42, the channel extension area 43 and the detection channel 44 are all hydrophobic and insulated, the hydrophobicity can ensure that the sample does not leak into gaps in the channel forming layer 4, and the insulation ensures that the channel forming layer 4 does not form a circuit with the first electrode 21 and the second electrode 22.

The shape of the sample receiving area 41 can be rectangular, U-shaped, elliptical, circular, tangential rectangular, and other geometric shapes. The shape of the sample receiving area 41 is preferably circular, with a diameter of 1.0 to 6.0 mm, preferably 1.5 to 3 mm. The length of the flow limit channel 42 is 0.5 to 10 mm, preferably 0.5 to 5 mm; and the width of the flow limit channel 42 is 0.1 to 3 mm, preferably 0.1 to 0.5 mm. The channel extension area 43 covers the reagent reaction area 31 and substantially matches the reagent reaction area 31 in size, so as to ensure maximum-area contact of the sample and the reaction reagent and adequate reaction. The shape of the channel extension area 43 can be rectangular, U-shaped, elliptical, circular, tangent rectangular, etc, preferably elliptical, with a length of 2 to 20 mm, preferably 4 to 7 mm, and with a width of 2 to 10 mm, preferably 2 to 6 mm. The detection channel 44 is preferably rectangular, with a length of 10 to 400 mm, preferably 20 to 50 mm, and with a width of 0.1 to 5 mm, preferably 0.1 to 1.5 mm. The thickness of the channel forming layer 4 can be 0.05 to 0.5mm, preferably 0.05 to 0.2mm.

The channel forming layer 4 undergoes laser cutting according to a predetermined pattern to form the sample receiving area 41, the flow limit channel 42, the channel extension area 43, and the detection channel 44 in the channel forming layer 4. Laser cutting may be performed before and after the channel forming layer 4 and the insulating layer 3 are assembled together. The channel forming layer 4 may optionally be a double-sided tape, so that the channel forming layer 4 can be directly adhered to the insulating layer 3. Moreover, the channel forming layer 4 may also be supported by a plastic sheet, and then one side of the plastic sheet is coated with a pressure-sensitive binder or a photosensitive polymer: the photosensitive polymer is bonded to the insulating layer 3 under the action of ultrasound, or the pressure-sensitive binder is bonded to the insulating layer 3 through extrusion. Moreover, the channel forming layer 4 containing the sample receiving area 41, the flow limit channel 42, the channel extension area 43 and the detection channel 44 can also be printed by a screen printing method according to a preset screen, and then bonded to the insulating layer 3 by a pressure-sensitive binder or a photosensitive polymer.

The upper cover layer 5 having a sample addition port 51 is disposed on the channel forming layer 4, the sample addition port 51 is located above the sample receiving area 41 of the channel forming layer 4 and overlaps with the same, so that the sample receiving area 41 of the channel forming layer 4 is partially or wholly exposed, and in this way, the sample added from the sample addition port 51 of the upper cover layer 5 will flow into the sample receiving area 41. The sample addition port 51 of the upper cover layer 5 is in communication with the sample receiving area 41, the flow limit channel 42, the channel extension area 43 and the detection channel 44 of the channel forming layer 4 in liquid path, and forms a sample channel together with the insulation layer 3 and the insulating substrate 1. The upper cover layer 5 contains a ventilation hole 52, which can be located above the detection channel 44 close to the electrical connection end 6 or above other parts of the detection channel 44, as long as it can be communicated with the sample channel in terms of airflow, for discharging air from the sample channel during sample addition. When the sample is added to the sample addition port 51, under the capillary action, the sample enters the sample receiving area 41 and the flow limit channel 42 through the sample addition port 51, and slowly flows into the reagent reaction area 31 to dissolve the reaction reagent and produce a chemical reaction, then it flows into the detection channel 44, and an electrical parameter can be detected after the sample is added.

The upper cover layer 5 is made of an insulating material, and the sample addition port 51 and the ventilation hole 52 in the upper cover layer 5 can be formed by laser cutting or mechanical perforating. Laser cutting or mechanical perforating can be performed before and after the upper cover layer 5 and the channel forming layer 4 are assembled together. When the channel forming layer 4 is a double-sided tape, the upper cover layer 5 may be directly adhered to the channel forming layer 4. When the channel forming layer 4 is not a double-sided tape, the channel forming layer 4 may also be supported by a plastic sheet, and then one side of the plastic sheet is coated with a pressure-sensitive binder or a photosensitive polymer: the photosensitive polymer is bonded to the channel forming layer 4 under the action of ultrasound, or the pressure-sensitive binder is bonded to the channel forming layer 4 through extrusion.

The test strip 100 is electrically connected to a detection instrument by inserting the first contact 25 and the second contact 26 located at the electrical connection end 6 into an electrical connector of the detection instrument, with the detection instrument applying a detection potential of 0.1 to 2.0 V and a detection frequency of 100 Hz to 20 KHz. When samples with different concentrations of FIB react chemically with the reaction reagent in the reagent reaction area 31, there is a difference in the degree of coagulation of blood samples, causing different flow rates of the samples, so that there's a difference in the number of interdigital electrode pairs 201 in the interdigital structure that the sample flows through (covers) in the same time. Such difference can be reflected by detecting an electrical parameter such as the impedance between the first contact 25 and the second contact 26. As the number of the interdigital electrode pairs 201 in the interdigital structure covered by the sample increases, the detected impedance value also decreases. If the FIB concentration of the sample is higher, the speed of blood coagulation is higher and the degree of blood coagulation is also higher after reaction of the sample and the reagent, and therefore its flow rate is slower, and the number of the interdigital electrode pairs 201 in the interdigital structure that the sample flows through in a certain time is fewer, resulting in a higher detected impedance value. Accordingly, it is possible to prepare a series of quality control materials with different FIB concentrations, detect the impedance value corresponding to each quality control material, establish a standard curve for detection, and then add a clinical sample with unknown FIB concentration and detect the impedance value at a predetermined time point after addition of the clinical sample, so that the FIB concentration in the clinical sample can be calculated quickly based on the impedance value of the detected clinical sample and the established standard curve. Preferably, the clinical sample is added in an amount of 10 to 20 μl. Preferably, the predetermined time point is no later than 200 seconds(s) after addition of the clinical sample, and more preferably, the predetermined time point is no later than 90s but no earlier than 30s after addition of the sample. The numbers of the resistance units of the first and second electrodes and the length of the test strip are increased or decreased as needed in an actual detection process.

Quality control materials with different concentrations of FIB can be prepared with various methods, such as first isolating healthy human plasma, or taking out of frozen healthy human plasma, then extracting FIB from the plasma, adding the extracted FIB to the original plasma or plasma lacking FIB to prepare plasma quality control materials with different concentrations of FIB, and using a Sysmex CA530 coagulometer (available from Sysmex Corporation) to detect the FIB concentrations in the plasma quality control materials (ZHOU Wenbin et al., Development and Evaluation of Quality Control Materials for Detection of Plasma Fibrinogen, Clinical Transfusion and Examination, 2013, 13(2):97-102). Furthermore, red blood cells can also be added to plasma quality control materials with different concentrations of FIB to prepare FIB whole blood quality control materials with different HCT levels, for example, FIB whole blood quality control materials with HCT being about 42%. In addition, a series of dilutions can be performed on FIB working solution (available from Calbiochem Corporation) with FIB concentration ranging from 6 to 24 mg/ml to prepare FIB quality control materials with different concentrations. The FIB concentrations in the whole blood quality control materials prepared by the present invention range from 0.7 to 5.5 g/L, which spans the normal physiological concentration range of FIB.

In a second embodiment of the present invention, test strip 100' is utilized to detect FIB in a sample such as blood, which differs from that in the first embodiment in that, given that the hematocrit (HCT) of the blood sample may affect the detection result, the test strip 100' may include, in addition to the first electrode 21 and the second electrode 22, a first HCT electrode 208 and a second HCT electrode 209 for detecting the HCT value of the blood sample (as in FIG. 4), and has the detection principle as shown in U.S. Pat. No. 6,258,229B1, wherein the HCT value of the blood sample can be calculated by detecting the impedance value after addition of the blood sample, so that the detected HCT value can be used to calibrate the electrical parameter detected by using the first electrode 21 and the second electrode 22 after addition of the sample.

The first HCT electrode 208 and the second HCT electrode 209 are disposed on the insulating substrate 1 and can be connected to the third contact 212 and the fourth contact 213 located at the electrical connection end 6 respectively by means of the third conductive trace 210 and the fourth conductive trace 211. The first HCT electrode 208 and the second HCT electrode 209 may be located on the same side of the insulating substrate 1 as the first electrode 21 and the second electrode 22, or may be located on the opposite side of the insulating substrate 1 as the first electrode 21 and the second electrode 22.

In a third embodiment of the present invention, test strip 101 is utilized to detect FIB in a sample such as blood, which differs from that in the first embodiment in the presence of an auxiliary diffusion assembly 27, as shown in FIGS. 5 to 7. The auxiliary diffusion assembly 27 is disposed on the insulating substrate 1, and located on the same side as the electrode system 2 on the insulating substrate 1. The reagent reaction area 31 of the insulating layer 3 is disposed above the auxiliary diffusion assembly 27. The auxiliary diffusion assembly 27 is made of a hydrophilic material, which may be either starch, polysaccharides, cellulose molecules, polyacrylic acid, polypropylene phthalamide, polyvinyl alcohol, polyurethane and polyamide, etc., or conductive graphite carbon, preferably conductive graphite carbon. The auxiliary diffusion assembly 27 can be directly bonded to the insulating substrate 1 with a binder. When being made of the conductive graphite carbon, the auxiliary diffusion assembly 27 can be screen printed on the insulating substrate 1 together with the electrode system 2.

In FIG. 7(*a*), the auxiliary diffusion assembly 27 is an interdigital structure with five interdigital pairs, and of course, the number of the interdigital pairs in the auxiliary diffusion assembly 27 can be increased or decreased according to practical needs, with each interdigital pair being made of conductive graphite carbon. In FIG. 7(*b*), the auxiliary diffusion assembly 27 is a rectangular structure with some lines arranged in parallel in the middle thereof, each line extends from one end of such rectangular structure to the opposite end, and the perimeter of such rectangular structure and each line are made of conductive graphite carbon. In FIG. 7(*c*), the auxiliary diffusion assembly 27 is an elliptical structure with lines arranged in parallel in the middle thereof, each line extends from one end of such elliptical structure to the opposite end, and the perimeter of such elliptical structure and each line are made of conductive graphite carbon. In FIG. 7(*d*), the auxiliary diffusion assembly 27 is a plurality of lines arranged in parallel, the number of which is eight in total, the number of the lines in the auxiliary diffusion assembly 27, of course, can be increased or decreased according to practical needs, and each line is made of conductive graphite carbon.

FIG. 7 gives only a few common structures of the auxiliary diffusion assembly 27. In fact, the auxiliary diffusion assembly 27 can be formed by arrangement of at least one straight line, at least one curved line or a combination thereof. It indicates by experiments that the presence of the auxiliary diffusion assembly 27 facilitates rapid and uniform diffusion of the reaction reagent solution in the reagent reaction area 31 of the insulating layer 3.

As shown in FIG. 5, the auxiliary diffusion assembly 27 in an interdigital structure, which is made of conductive graphite carbon, is separated from the interdigital structure 200 formed by the first electrode 21 and the second electrode 22. The distance separating the auxiliary diffusion assembly 27 from the interdigital structure 200 formed by the first electrode 21 and the second electrode 22 may be 0.1 to 5 mm, preferably 0.15 to 2 mm. Given that the detection area 32 exposes all interdigital electrode pairs 201 of the interdigital structure 200, the separation of the auxiliary diffusion assembly 27 and the interdigital structure can ensure that all detection signals come from the interdigital structure exposed by the detection area 32, so that it can avoid interference of extraneous signals from the auxiliary diffusion assembly 27, thus facilitating improvement of the gradient of the detection signals.

In a fourth embodiment of the present invention, as shown in FIGS. 8 and 9, test strip 102 is utilized to detect FIB in a sample such as blood, which differs from that in the third embodiment in that the auxiliary diffusion assembly 27' in an interdigital structure, which is made of conductive graphite carbon, is connected to the interdigital structure 200 formed by the first electrode 21 and the second electrode 22. Preferably, the plurality of resistance units 202, the plurality of resistance units 203 and the auxiliary diffusion assembly 27' are all made of conductive graphitic carbon. After addition of the reaction reagent solution, the auxiliary diffusion assembly 27' not only has the function of assisting the rapid and uniform diffusion of the reaction reagent solution in the reaction reagent area 31, but also involves in the detection together with the interdigital structure 200. Given that the auxiliary diffusion assembly 27' is connected to the interdigital structure 200, the manufacturing process of the test strip 102 is relatively simple, and no auxiliary diffusion assembly needs to be made individually. Moreover, test strip 102 is also able to effectively detect an electrical parameter, preferably impedance, after addition of samples with different FIB concentrations.

In a fifth embodiment of the present invention, test strip 110 is utilized to detect FIB in a sample such as blood, which differs from that in the first embodiment in the structure of the channel forming layer 4, as shown in FIG. 10. The channel forming layer 4 has a sample receiving area 41 located at the sample addition end 7 and a long detection channel 44. A first end of the detection channel 44 is connected to the sample receiving area 41 and a second end of the detection channel 44 continues to extend toward the electrical connection end 6. Preferably, the second end of the detection channel 44 is aligned with the end of the detection area 32 close to the electrical connection end 6. More preferably, the second end of the detection channel 44 may also continue to extend toward the electrical connection end 6 to be over the insulating area of the insulating layer 3 close to the electrical connection end 6, but cannot be aligned with the electrical connection end 6 of the insulating layer 3.

The detection channel 44 is located above the detection area 32 and the reagent reaction area 31, leaving the detection area 32 and the reagent reaction area 31 to be partially or wholly exposed. The width of the detection channel 44 may be larger than or equal to or smaller than the width of the detection area 32, with the width of the detection channel 44 being ⅒ to 10 times the width of the detection area 32. When the width of the detection channel 44 is larger or smaller than the width of the detection area 32, this can ensure that the width of the interdigital structure exposed by the detection channel 44 does not change due to the relative offset among the insulating substrate 1, the insulation layer 3 and the channel forming layer 4 during assembly of test strip 110, thus ensuring that the electrical signals generated by different batches of test strips 100 remain consistent. Preferably, the width of the detection channel 44 is larger than the width of the detection area 32, i.e., 1.2 to 3 times the width of the detection area 32; more preferably, the width of the detection channel 44 is smaller than the width of the detection area 32, i.e., ⅕ to ⅘ the width of the detection area 32, which can reduce the required amount of the sample.

Moreover, test strip 110 can also be provided with no insulating layer 3, as shown in FIG. 15. In this case, the channel forming layer 4 is directly disposed above the insulating substrate 1, the detection channel 44 of the channel forming layer 4 is in communication with the electrode system 2 in liquid path, and the first electrode 21 and the second electrode 22 are partially or wholly exposed. The blood sample added through the sample addition port 51 enters the sample receiving area 41 and subsequently enters the detection channel 44, and then comes into contact with the first electrode 21 and the second electrode 22 and reacts with the reaction reagent located between the first resistance element of the first electrode 21 and the sample addition end 7.

In a sixth embodiment of the present invention, test strip 100 is utilized to detect FIB in a sample such as blood, which differs from that in the first embodiment in the structure(s) of the first electrode 21 and/or the second electrode 22, as shown in FIGS. 11 to 14.

In FIG. 11, the first electrode 21 includes a first resistance element (the part surrounded by a dashed line on the left in FIG. 11(c)) connected to the first conductive trace 23, the first resistance element including a plurality of resistance units 202; the second electrode 22 includes a second resistance element (the part surrounded by a dashed line on the right in FIG. 11(c)) connected to the second conductive trace 24, the second resistance element including a plurality of resistance units 203; and the plurality of resistance units 202 of the first resistance element and the plurality of resistance units 203 of the second resistance element form the interdigital structure 200. The interdigital structure in FIG. 11 differs from that in FIG. 3 in that the width of each resistance unit 202 of the first resistance element is larger than the width of each resistance unit 203 of the second resistance element. Of course, the width of each resistance unit 202 may also be smaller than the width of each resistance unit 203. In addition to this, the length of each resistance unit 202 may be larger than, equal to, or smaller than the length of each resistance unit 203. After a sample is added, at a predetermined detection point in time for detecting a coagulation indicator by using the first electrode 21 and the second electrode 22, the sample covers at least a part of the first resistance element but does not flow beyond the front end 8 of the first resistance element. The distance between the front end 9 of the second resistance element and the sample addition end 7 is smaller than the distance between the front end 8 of the first resistance element and the sample addition end 7.

The interdigital structure of FIG. 12(b) differs from that in FIG. 3 in the structure of the first electrode 21: the first electrode 21 includes a first resistance element connected to the first conductive trace 23, and the first resistance element contains a plurality of resistance units 202 that form a serpentine structure, and the serpentine structure includes a plurality of serpentine units 202. As described in FIG. 12(a), each serpentine unit 202 is a resistance unit, and two adjacent serpentine units 202 are connected together end to end, and one of these plurality of serpentine units 202 is connected to the first conductive trace 23. Each serpentine unit 202 may have a different resistance value, and preferably each serpentine unit 202 may have the same resistance value. A part between the two ends of each serpentine unit 202 extends toward the second electrode 22, but is not connected to the second electrode 22. The second electrode 22 includes a second resistance element connected to the second conductive trace 24, and the second resistance element includes a plurality of resistance units 203. The plurality of serpentine units of the first resistance element and the plurality of resistance units 203 of the second resistance element form an interdigital structure 200. Of course, the plurality of resistance units 202 of the first electrode 21 and the plurality of resistance units 203 of the second electrode 22 both form a serpentine structure, and the serpentine structure of the first electrode 21 and the serpentine structure of the second electrode 22 form an interdigital structure. After a sample is added, at a predetermined detection point in time for detecting a coagulation indicator by using the first electrode 21 and the second electrode 22, the sample covers at least a part of the first resistance element but does not flow beyond the front end 8 of the first resistance element. The distance between the front end 9 of the second resistance element and the sample addition end 7 is smaller than the distance between the front end 8 of the first resistance element and the sample addition end 7.

In FIG. 13(a), the first electrode 21 includes a first resistance element connected to the first conductive trace 23, the first resistance element containing a plurality of resistance units 202; and the second electrode 22 includes a second resistance element connected to the second conductive trace 24, the second resistance element including a plurality of resistance units 203. Any two adjacent resistance units 202 of the first resistance element remain parallel, and have the same spacing distance. Any two adjacent resistance units 203 of the second resistance element remain parallel, and have the same spacing distance. In contrast to FIG. 3, however, the first electrode 21 and the second electrode 22 in FIG. 13(a) do not form an interdigital structure. The first end 221 of each resistance unit 202 of the first resistance element is connected to the first conductive trace 23, and the first end 231 of each resistance unit 203 of the second resistance element is connected to the second conductive trace 24. The second end 222 of each resistance unit 202 of the first resistance element extends toward the second electrode 22 but does not extend beyond the second end 232 of each resistance unit 203 of the second resistance element, which means that there is a distance spacing between each resistance unit 202 of the first resistance element and each resistance unit 203 of the second resistance element. Each resistance unit 202 of the first resistance element and each resistance unit 203 of the second resistance element may have or may not have the same length. Any two adjacent resistance units 202 of the first resistance element have the same distance spacing, and any two adjacent resistance units 203 of the second resistance element the same distance spacing, but the distance spacing between any two adjacent resistance units 202 of the first resistance element is smaller than the distance spacing between any two adjacent resistance units 203 of the second resistance element. After a sample is added, at a predetermined detection point in time for detecting a coagulation indicator by using the first electrode 21 and the second electrode 22, the sample covers at least a part of the first resistance element but does not flow beyond the front end 8 of the first resistance element. The distance between the front end 9 of the second resistance element and the sample addition end 7 is equal to the distance between the front end 8 of the first resistance element and the sample addition end 7.

In FIG. 13(b), the first electrode 21 includes a first resistance element connected to the first conductive trace 23, the first resistance element containing a plurality of resistance units 202; and the second electrode 22 includes a second resistance element connected to the second conductive trace 24, the second resistance element including a plurality of resistance units 203. The first electrode 21 and the second electrode 22 in FIG. 13(b) differ from those in FIG. 13(a) in that: the distance spacing between any two adjacent resistance units 202 of the first resistance element is equal to the distance spacing between any two adjacent resistance units 203 of the second resistance element; each resistance unit 202 of the first resistance element is in one-to-one correspondence with each resistance unit 203 of the second resistance element, and one resistance unit 202 of the first resistance element and one resistance unit 203 of the second resistance element that have the correspondence are on the same line. Each resistance unit 202 of the first resistance element has the same length as each resistance unit 203 of the second resistance element. Of course, the length of each resistance unit 202 of the first resistance element may also be larger or smaller than the length of each resistance unit 203 of the second resistance element. After a sample is added, at a predetermined detection point in time for detecting a coagulation indicator by using the first electrode 21 and the second electrode 22, the sample covers at least a part of the first resistance element but does not flow beyond the front end 8 of the first resistance element. The distance between the front end 9 of the second resistance element and the sample addition end 7 is equal to the distance between the front end 8 of the first resistance element and the sample addition end 7.

In FIG. 14(a), the first electrode 21 includes a first resistance element in addition to a first contact 25 and a first conductive trace 23 connected to the first contact 25, the first resistance element including a plurality of resistance units 202 spaced apart from each other; and the second electrode 22 includes a second contact 26 and a second conductive trace 24 connected to the second contact 26. The first end 221 of each resistance unit 202 of the first resistance element is connected to the first conductive trace 23, and the second end 222 of each resistance unit 202 of the first resistance element extends toward the second electrode 22 but is not connected to the second electrode 22. However, the second electrode 22 does not have a plurality of resistance units extending toward the first electrode 21. Preferably, the length of each resistance unit 202 of the first resistance element is larger than half of the distance between the first conductive trace 23 and the second conductive trace 24. After a sample is added, at a predetermined detection point in time for detecting a coagulation indicator by using the first electrode 21 and the second electrode 22, the sample covers at least a part of the first resistance element but does not flow beyond the front end 8 of the first resistance element. The distance between the front end 9 of the second resistance element and the sample addition end 7 is equal to the distance between the front end 8 of the first resistance element and the sample addition end 7.

In FIG. 14(b), the first electrode 21 includes, in addition to a first contact 25 and a first conductive trace 23 connected to the first contact 25, a first resistance element which is a resistance unit 202. The second electrode 22 includes a second contact 26 and a second conductive trace 24 connected with the second contact 26. The first end of the first resistance element is connected with the first conductive trace 23, and the second end of the first resistance element extends toward the second electrode 22 but is not connected to the second electrode 22. In addition, the second electrode 22 does not have a plurality of resistance units extending toward the first electrode 21. In contrast to FIG. 14(a), the difference in FIG. 14(b) is that the first resistance element is an entirety and can be neither divided into a plurality of resistance units spaced apart at a distance nor divided into a plurality of resistance units connected together end to end. After a sample is added, at a predetermined detection point in time for detecting a coagulation indicator by using the first electrode 21 and the second electrode 22, the sample covers at least a part of the first resistance element but does not flow beyond the front end 8 of the first resistance element. The distance between the front end 9 of the second resistance element and the sample addition end 7 is equal to the distance between the front end 8 of the first resistance element and the sample addition end 7.

In FIGS. 11 to 14, the present invention is illustrated for several common variants of the first electrode and the second electrode. It can be reasonably derived that in FIGS. 11 to 14, the structures of the first electrode and the second electrode are interchangeable no matter in any variant or between different variants, the first electrode in any variant and the first electrode in other different variant are interchangeable, and the second electrode in any variant and the second electrode in one different variant are interchangeable. Of course, the structures of the first electrode and the second electrode of the present invention are not limited to those described above. In fact, no matter which structures are adopted, as long as the first electrode and the second electrode or the resistance elements provided by the first electrode and the second electrode are regularly distributed, and the first electrode and the second electrode are not connected together, the structures can be used as the structures of the first electrode and the second electrode.

Regardless of any of the above mentioned embodiments of the present invention, the reaction reagent is placed on the reagent reaction area 31. The reaction reagent solution is added to the reagent reaction area 31 by a method such as solution dripping or screen printing. The reaction reagent on the reagent reaction area 31 includes thrombin, a coagulation inhibitor, and also at least a polymer binder, a surfactant, a stabilizer, and a buffer.

In the reaction reagent, the thrombin may be human or animal-derived thrombin, preferably bovine thrombin, and its concentration is preferably 10 U/mL to 300 U/mL. The reaction reagent also needs to contain a coagulation inhibitor for inhibiting the coagulation reaction, otherwise too fast coagulation reaction is unfavorable for the detection. The coagulation inhibitor used in the present invention can be selected from bis-lactobionic acid amide derivative, hirudin and sulfated polysaccharides, or the like. When the bis-lactobionic acid amide derivative is used, its concentration is preferably 5 mg/mL to 100 mg/mL. When hirudin is used, its concentration is preferably 1 mg/mL to 50 mg/mL. When the sulfated polysaccharide is used, dextran sulfate with the molecular weight of 5000 to 10000 Da is preferred, and its concentration is preferably 0.1% to 10% (w/w).

The polymeric binder should have good water solubility, and should also be able to bind other chemical reagents in the detection reagent, thus allowing these reaction reagents to remain stable. The polymeric binder is preferably a cellulose derivative, such as methyl cellulose, ethyl cellulose, hydroxymethyl cellulose and cellulose acetate, and its concentration is preferably 0.01% to 10% (w/w).

The surfactant serves to facilitate diffusion of the added reaction reagent solution in the reagent reaction area 31, as well as to rapidly dissolve the reaction reagent present in a solid form on the reagent reaction area 31 when the sample is added. The surfactant can be selected from an anionic surfactant, a nonionic surfactant, and a cationic surfactant, such as the PEG series of surfactants, the Tween series of surfactants (Tween-20, Tween-21, Tween-40, Tween-60, Tween-61, Tween-80, Tween-81, Tween-85), sodium cholate, CHAP, Triton X-100, and cetylcholine etc. The concentration of the surfactant used is typically 0.01 to 5% (w/w).

The buffer may also be contained in the reaction reagent, and the amount of the buffer present should be kept sufficient so that the pH value of the reaction mixture is kept in a suitable range when the sample is added, thus ensuring that the catalytic activity of thrombin is at a high level. The buffer may be selected from citrate buffer, phosphate buffer, HEPES, Tris-HCl buffer, etc., with the pH of 6.5 to 8.0.

The stabilizer may also be added to the reaction reagent, which functions to help the reaction reagent to keep stable and have a longer storage life. The stabilizer may be selected from sugar or sugar alcohol (such as sucrose, fucose, mannitol, sorbitol, trehalose and lactose), amino acid, protein (such as BSA and casein) and carboxyl-containing organic acid (such as EDTA), etc., the concentration of which is usually 0.1% to 30% (w/w).

Of course, in addition to detecting FIB in the blood sample, the present invention can also detect other coagulation indicator such as plasma prothrombin time (PT), activated partial thromboplastin time (APTT) and plasma thromboplastin time (TT) by changing the reaction reagent. Furthermore, in addition to detecting the impedance value after addition of the sample by using the first electrode 21 and the second electrode 22, other electrical parameter, such as current, voltage or conductance, can also be detected.

EXAMPLE 1 Reaction Reagent Preparation

The reaction reagent in the present invention is prepared as below:

The reaction reagent of the present invention: the reaction reagent contains a buffer (0.05 to 0.3M HEPES (pH 6.5 to 8.0)), 0.25% to 1% (w/w) trehalose, 0.1% to 0.6% (v/v) Triton X-100, bovine thrombin (10 to 300 U/mL); and dextran sulfate having a molecular weight of 5000 to 10000 Da and a preferred concentration of 0.1% to 10% (w/w).

Reaction reagent 1 of the present invention: the reaction reagent contains a buffer (0.05M HEPES (pH 7.4)), 0.5% (w/w) trehalose, 0.3% (v/v) Triton X-100, 100 U/mL bovine thrombin; and dextran sulfate having a molecular weight of 8000 Da and a preferred concentration of 5% (w/w).

Reaction reagent 2 of the present invention: the reaction reagent contains a buffer (0.1M HEPES (pH 7.2)), 0.5% (w/w) trehalose, 0.3% (v/v) Triton X-100, 30 U/mL bovine thrombin; and dextran sulfate having a molecular weight of 8000 Da and a preferred concentration of 3% (w/w).

Reaction reagent 3 of the present invention: the reaction reagent contains a buffer (0.3M HEPES (pH 8.0)), 0.25% (w/w) trehalose, 0.1% (v/v) Triton X-100, 300 U/mL bovine thrombin; and dextran sulfate having a molecular weight of 10000 Da and a preferred concentration of 10% (w/w).

Reaction reagent 4 of the present invention: the reaction reagent contains a buffer (0.3M HEPES (pH 6.5)), 1% (w/w) trehalose, 0.6% (v/v) Triton X-100, 10 U/mL bovine thrombin; and dextran sulfate having a molecular weight of 5000 Da and a preferred concentration of 1% (w/w).

In addition, the buffer HEPES in the reaction reagent can also be replaced with either 0.1-0.2M PBS (pH 7.4±0.2) commonly used in the laboratory, or a citric acid buffer or a Tris-HCl buffer; and the stabilizer trehalose can also be replaced with sucrose, the concentration of which was preferably 0.5% to 5% (w/w). The stabilizer can also be selected from fucose, mannitol, sorbitol, lactose, amino acid, BSA, casein and carboxyl-containing organic acid (such as EDTA), the concentration of which was usually 0.1% to 30%(w/w); dextran sulfate can be replaced with bis-lactobionic acid amide derivative or hirudin, the concentration of which is preferably 5 mg/mL to 100 mg/mL when bi-lactamide derivative is selected or preferably 1 mg/mL to 50 mg/mL when hirudin is selected.

EXAMPLE 2: Detection Method

The biosensor shown in the third or fourth embodiment of the present invention was utilized to detect a blood sample, and the blood sample can be selected from plasma or whole blood, and whole blood sample is taken as an example here for illustration. The detailed steps are shown as follows:

(1) The electrical connection end of the biosensor is inserted into an electrical connector of a detection instrument (there are many types of the detection instrument, here taking an electrochemical workstation Biologic VSP EC-Lab as an example for illustration) through the first contact and the second contact of the biosensor. The detection instrument applies a detection potential of 0.1 to 2.0 V between the first and second contacts of the biosensor and a detection frequency of 100 Hz to 20 KHz, here taking a potential of 0.25 V and a frequency of 1 KHz as an example for illustration.

(2) A variety of whole blood quality control materials with different FIB concentrations (HCT 42% and four different FIB concentrations 0.74 g/mL, 2.63 g/mL, 3.68 g/mL and 4.53 g/mL are illustrated here) are selected. The whole blood quality control material is added to the sample addition port of the biosensor, and then flows to the reagent reaction area and reacts with the reaction reagent therein, and the mixture subsequently flows into the detection channel. Preferably, each whole blood quality control material is added in an amount of 10 to 20 μl.

(3) When each whole blood quality control material flows into the interdigital structure exposed by the detection area, it is conductive between the first electrode and the second electrode, and the impedance value between the first contact and the second contact is detected using the detection instrument.

(4) Each whole blood quality control material with a different FIB concentration is detected in parallel for several times (generally 3 to 5 times), and then the average value of the impedance values measured for multiple times is calculated. Given the linear relationship between the FIB concentration in the whole blood quality control materials and the detected impedance values, a linear equation between the two can be obtained.

(5) A clinical whole blood sample is added to the sample addition port of the biosensor, the impedance value of the clinical whole blood is detected, and the FIB concentration of the clinical whole blood sample is obtained according to the linear equation in (4). Preferably, the clinical whole blood sample is added in an amount of 10 to 20 μl.

When the reaction reagent 1 of the present invention in Example 1 and the biosensor in the third embodiment of the present invention are used, whole blood quality control materials with different FIB concentrations (HCT 42% and four different FIB concentrations 0.74 g/mL, 2.63 g/mL, 3.68 g/mL and 4.53 g/mL are illustrated here) are selected, and subsequently 15 μl of each whole blood quality control material with a different FIB concentration is added to the biosensor. The detection is performed according to the detection method in Example 2, with the results being shown in Tables 1-3 and FIGS. 16-17. It can be seen from the time-impedance linear equation at different time points that the impedance can be accurately detected at 30s to 90s. The longer the flow time of the whole blood quality control material is, the higher the slope of the obtained linear equation is, but $R^2$ of the linear equation tends to decrease with the extension of time. Therefore, the detection time of about 60s is optimal, preferably 60s. It can thus be seen that this detection method has a good gradient for measured impedance values of whole blood quality control materials with different FI B concentrations, and the relative deviation of potential differences measured in parallel for multiple times is small (CV<10%), and the measurement is relatively accurate.

TABLE 1

Detection Result at 30 s

| | Hematocrit 42% | | | |
| | FIB concentration (g/L) | | | |
| | 0.74 | 2.63 | 3.68 | 4.53 |
| Detection result (30 s) | Impedance (Impedance/Ω) | | | |
| Rep. 1 | 7811 | 9916 | 11061 | 12297 |
| Rep. 2 | 8278 | 10084 | 11329 | 12474 |
| Rep. 3 | 7786 | 9772 | 11400 | 13052 |
| Average value | 7958 | 9924 | 11263 | 12608 |
| SD | 277 | 157 | 179 | 395 |
| CV | 3.5% | 1.6% | 1.6% | 3.1% |

TABLE 2

Detection Result at 60 s

| | Hematocrit 42% | | | |
| | FIB concentration (g/L) | | | |
| | 0.74 | 2.63 | 3.68 | 4.53 |
| Detection result (60 s) | Impedance (Impedance/Ω) | | | |
| Rep. 1 | 5796 | 9249 | 11050 | 11993 |
| Rep. 2 | 6402 | 8946 | 11013 | 12214 |
| Rep. 3 | 6020 | 9000 | 11205 | 12478 |
| Average value | 6073 | 9065 | 11089 | 12229 |
| SD | 306 | 161 | 102 | 243 |
| CV | 5.1% | 1.8% | 0.9% | 2.0% |

TABLE 3

Detection Result at 90 s

| | Hematocrit 42% | | | |
| | FIB concentration (g/L) | | | |
| | 0.74 | 2.63 | 3.68 | 4.53 |
| Detection result (90 s) | Impedance (Impedance/Ω) | | | |
| Rep. 1 | 4426 | 8517 | 11049 | 11895 |
| Rep. 2 | 4915 | 8035 | 10879 | 12221 |
| Rep. 3 | 4285 | 8418 | 11110 | 12519 |
| Average value | 4542 | 8323 | 11013 | 12212 |
| SD | 331 | 255 | 120 | 312 |
| CV | 7.3% | 3.1% | 1.1% | 2.6% |

EXAMPLE 4: Impedance Detection

Figure 18:
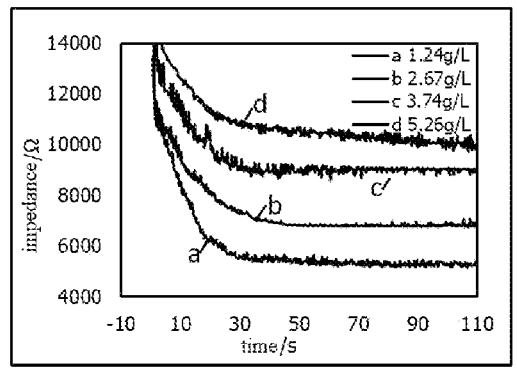
FIG. 18 is a graph of detection results obtained by using the impedance method for detection when using the reaction reagent 1 of the present invention in Example 1 and using the biosensor structure in the fourth embodiment of the present invention.
Figure 19:
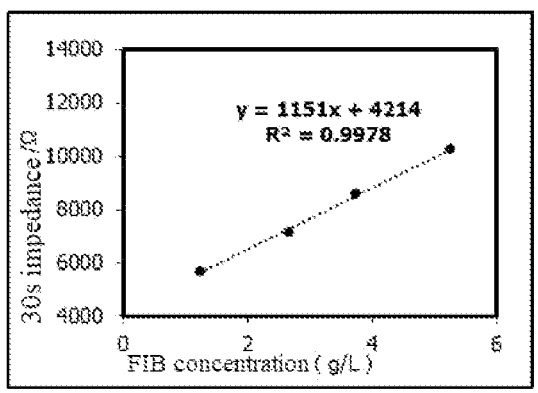
FIG. 19(a) is a linear equation graph obtained by using the impedance method for detection at 30s.
FIG. 19(b) is a linear equation graph obtained by using the impedance method for detection at 60s.
FIG. 19(c) is a linear equation graph obtained by using the impedance method for detection at 90s, when using the reaction reagent 1 of the present invention in Example 1 and using the biosensor structure in the fourth embodiment of the present invention.
Figure 19:
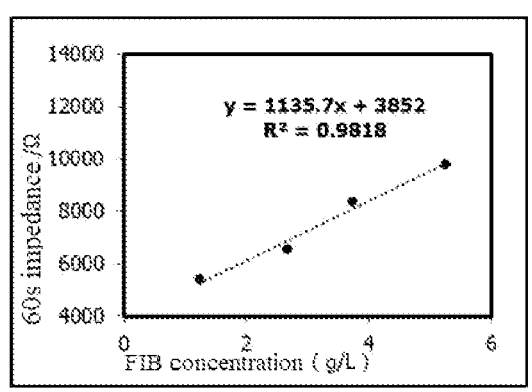
Figure 19:
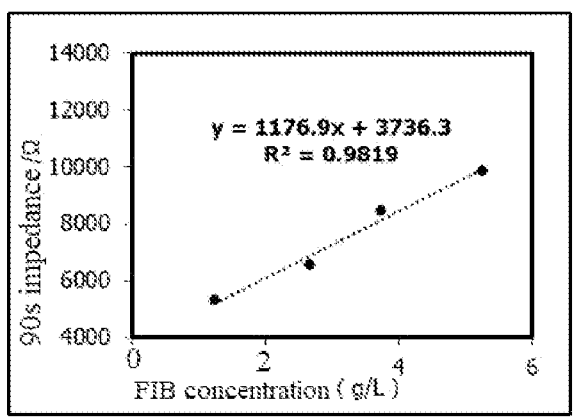

When the reaction reagent 1 of the present invention in Example 1 and the biosensor structure in the fourth embodiment of the present invention are used, whole blood quality control materials with different FIB concentrations (HCT 42% and four different FIB concentrations 1.24 g/mL, 2.67 g/mL, 3.74 g/mL and 5.26 g/mL are illustrated here) are selected, and subsequently 15 μl of each whole blood quality control material at a different FIB concentration is added to the biosensor. The detection is performed according to the detection method in Example 2, with the results being shown in Tables 4-6 and FIGS. 18-19. The time-impedance linear equation at different time points shows that the impedance can be accurately detected at 30s to 90s after addition of the sample. R2 of the linear equation tends to decrease significantly with passage of the detection time. Therefore, the detection time of about 30s is optimal, preferably 30s. It can thus be seen that this detection method has a good gradient for measured impedance values of whole blood quality control materials with different FIB concentrations, and the relative deviation of potential differences measured in parallel for multiple times is within a reasonable range (CV<13%), and the measurement is relatively accurate.

TABLE 4

Detection Result at 30 s

| | Hematocrit 42% FIB concentration (g/L) | | | |
|---|---|---|---|---|
| | 1.24 | 2.67 | 3.74 | 5.26 |
| Detection result (30 s) | Impedance (Impedance/Ω) | | | |
| Rep. 1 | 5529 | 6736 | 9017 | 9967 |
| Rep. 2 | 6274 | 7285 | 8401 | 9931 |
| Rep. 3 | 5264 | 7468 | 8395 | 10880 |
| Average value | 5689 | 7163 | 8604 | 10259 |
| SD | 524 | 381 | 358 | 538 |
| CV | 9.2% | 5.3% | 4.2% | 5.2% |

TABLE 5

Detection Result at 60 s

| | Hematocrit 42% FIB concentration (g/L) | | | |
|---|---|---|---|---|
| | 1.24 | 2.67 | 3.74 | 5.26 |
| Detection result (30 s) | Impedance (Impedance/Ω) | | | |
| Rep. 1 | 5433 | 5836 | 8902 | 9502 |
| Rep. 2 | 6046 | 6795 | 7720 | 9451 |
| Rep. 3 | 4718 | 6948 | 8406 | 10453 |
| Average value | 5399 | 6526 | 8343 | 9802 |
| SD | 665 | 603 | 594 | 564 |
| CV | 12.3% | 9.2% | 7.1% | 5.8 |

TABLE 6

Detection Result at 90 s

| | Hematocrit 42% FIB concentration (g/L) | | | |
|---|---|---|---|---|
| | 1.24 | 2.67 | 3.74 | 5.26 |
| Detection result (30 s) | Impedance (Impedance/Ω) | | | |
| Rep. 1 | 5289 | 5875 | 8998 | 9252 |
| Rep. 2 | 5900 | 6794 | 7575 | 9862 |
| Rep. 3 | 4695 | 6965 | 8760 | 10452 |
| Average value | 5295 | 6545 | 8444 | 9855 |
| SD | 603 | 586 | 762 | 600 |
| CV | 11.4% | 9.0% | 9.0% | 6.1% |

EXAMPLE 5: Detection of Clinical Sample

This Example used the reaction reagent 1 of the present invention in Example 1 and the biosensor structure in the third embodiment of the present invention to detect the impedance values of two whole blood samples of human venous blood at 30s, 60s and 90s after addition of 15 μl of each sample, and figure out the FIB concentrations in the whole blood samples according to the linear equation obtained in Example 3 using the whole blood quality control materials with different FIB concentrations. Meanwhile, the plasma of the two whole blood samples is obtained, and the FIB values of the obtained plasma are detected using a Sysmex CA530 coagulometer (available from Sysmex Corporation), and then the FIB value measured by the present invention and the FIB value measured by the Sysmex CA530 coagulometer (as a control value) are compared, and the deviation between these two values is calculated: (the control valu—the calculated value of the present invention)/the control value. The results are as shown in Tables 7 and 8.

TABLE 7

Measured values of clinical whole blood sample 1

Whole blood sample 1 — Measured value from SYSMEX CA530 coagulometer: 3.54 G/L (as control value)

| Detection time | Impedance value measured in the present invention | Linear equation | Calculated FIB concentration | Deviation from control value |
|---|---|---|---|---|
| 30 s | 10812.98242 | y = 1208.9x + 6938.6 | 3.205 | 9.5% |
| 60 s | 10161.17285 | y = 1736.5x + 4507.1 | 3.256 | 8.0% |
| 90 s | 9970.87744 | y = 2076.3x + 3011.5 | 3.352 | 5.3% |

TABLE 8

Measured values of clinical whole blood sample 2

Whole blood sample 2 — Measured value from SYSMEX CA530 coagulometer: 2.78 G/L (as control value)

| Detection time | Impedance value measured in the present invention | Linear equation | Calculated FIB concentration | Deviation from control value |
|---|---|---|---|---|
| 30 s | 9969.88574 | y = 1208.9x + 6938.6 | 2.507 | 9.8% |
| 60 s | 9126.58301 | y = 1736.5x + 4507.1 | 2.660 | 4.3% |
| 90 s | 8631.95508 | y = 2076.3x + 3011.5 | 2.707 | 2.6% |

As can be seen from Tables 7 and 8, the deviations of the calculated values obtained in the present invention from the control values measured by the Sysmex CA530 coagulometer are within 10%, which indicates that the detection results of the present invention are accurate. Importantly, the Sysmex CA530 coagulometer requires extraction of plasma from a whole blood sample for measurement, and then the measurement is performed by optical means. The present invention allows direct measurement of whole blood samples without plasma separation, thus eliminating the need for collection of more blood.

The invention claimed is:

1. A biosensor for detecting an analyte of interest in a biological sample, comprising:
    an insulating substrate having a sample addition end, an electrical contact end distal from the sample addition end, and an upper surface having a first axis extending from the sample addition end to the electrical contact end and a second axis perpendicular to the first axis extending from a first lateral side of the insulating substrate to a second lateral side of the insulating substrate;
    a channel forming layer overlying the upper surface of the insulating substrate and comprising an opening defining a sample receiving space proximal to the sample addition end and a detection channel extending from the sample receiving space along the first axis of the insulating substrate, wherein the detection channel terminates at an end position proximal to the electrical contact end;
    an upper cover layer overlying the channel forming layer and comprising a sample addition port in fluid communication with the sample receiving space and a vent hole in fluid communication with the end position of the detection channel, wherein the channel forming layer and the upper cover layer together define a capillary space overlying the insulating substrate such that fluid introduced into the sample addition port flows to the end position of the detection channel by capillary force;
    an electrode system on the upper surface comprising
        a first electrical contact and a second electrical contact proximal to the electrical contact end,
        a first resistance element electrically connected to the first electrical contact and positioned between the sample receiving space and the electrical contact end, the first resistance element providing a first conductive trace extending along the first axis and a plurality of first resistance units spaced apart from one another along the first axis, wherein each first resistance unit extends from the first conductive trace partially across the upper surface along the second axis,
        a second resistance element electrically connected to the second electrical contact and positioned between the sample receiving space and the electrical contact end, the second resistance element providing a second conductive trace extending along the first axis and a plurality of second resistance units spaced apart from one another along the first axis, wherein each second resistance unit extends from the second conductive trace across the upper surface along the second axis in a second direction opposite to the first direction,
        wherein the plurality of second resistance units interdigitate with the plurality of first resistance units and wherein the capillary space overlies the interdigitated first and second resistance units such that the interdigitated first and second resistance units are in fluid communication with the capillary space; and
    a reaction reagent positioned within the capillary space proximal to the sample addition end,
        wherein the reaction reagent is configured and arranged to control the rate of flow of the biological sample from the sample addition port through the capillary space based on the concentration of the analyte of interest in the biological sample by participating in a coagulation reaction with the analyte of interest, whereby the concentration of the analyte of interest produces a change in an electrical parameter determined between the first electrical contact and the second electrical contact resulting from the number of interdigitated first and second resistance units contacted by the biological sample in a given time.

2. The biosensor of claim 1, wherein the interdigitated first and second resistance units terminate prior to the position of the reaction reagent within the capillary space.

3. The biosensor of claim 1, wherein any two adjacent resistance units of the first resistance element have the same distance spacing.

4. The biosensor of claim 2, wherein any two adjacent resistance units of the second resistance element have the same distance spacing.

5. The biosensor according to claim 1, wherein the analyte of interest is fibrinogen and the reaction reagent comprises thrombin and a coagulation inhibitor.

* * * * *